United States Patent [19]

Bender

[11] Patent Number: 5,004,014
[45] Date of Patent: Apr. 2, 1991

[54] AUTOMATIC FLUID FLOW SENSOR AND FLUID SHUT-OFF SYSTEM

[76] Inventor: Richard C. Bender, 24031 Mariano St., Woodland Hills, Calif. 91367

[21] Appl. No.: 545,595

[22] Filed: Jun. 29, 1990

[51] Int. Cl.[5] ............................................. F16K 31/02
[52] U.S. Cl. .............................. 137/624.12; 137/486; 137/495; 137/487.5
[58] Field of Search ...................... 137/624.12, 624.11, 137/486, 495, 487.5, 553; 73/861.42, 861; 116/264, 277

[56] References Cited

U.S. PATENT DOCUMENTS

| | | | |
|---|---|---|---|
| 4,180,088 | 12/1979 | Mallett | 137/624.12 X |
| 4,249,565 | 2/1981 | Brust | 137/495 |
| 4,589,435 | 5/1986 | Aldrich | 137/624.12 X |
| 4,735,231 | 4/1988 | Jacquet | 137/486 X |
| 4,911,200 | 3/1990 | Ben-Arie | 137/624.12 X |
| 4,926,901 | 5/1990 | Waltenburg | 137/624.12 X |

Primary Examiner—Alan Cohan
Attorney, Agent, or Firm—Albert O. Cota

[57] ABSTRACT

An automatic fluid-sensing and fluid shut-off system (10) that allows a flow of water into a structure to be sensed, timed and stopped when the flow exceeds a preset time. The system (10), which operates in combination with a conventional main water valve (50) and pressure regulator (60), consists of a flow-sensing valve (12) that incorporates an infrared emitter (14) and an infrared detector (16), an electric valve (18) and an electronics control unit (20). When a flow is sensed by the valve (12), the detector (16) produces a flow-trigger signal that is applied to a programmable timer (20n) in the unit (20). When the signal is received, the timer commences a countdown; when the time has lapsed, the unit (20) produces a signal that energizes a power relay (20h) that removes the power keeping the electric valve (18) open. Upon this power removed, the valve (18) closes and shuts off the water supply. The water flow remains off until the system is reset by depressing a reset switch (20r).

10 Claims, 5 Drawing Sheets

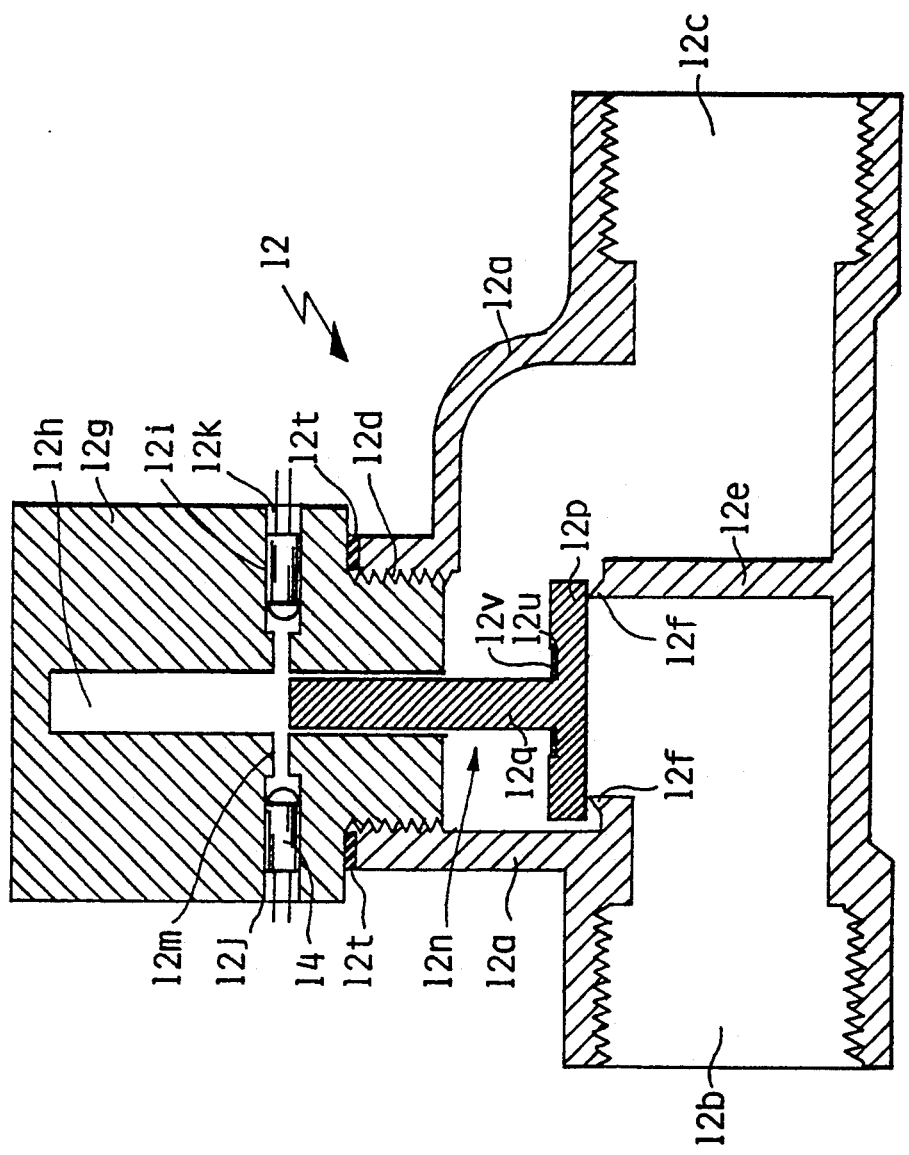
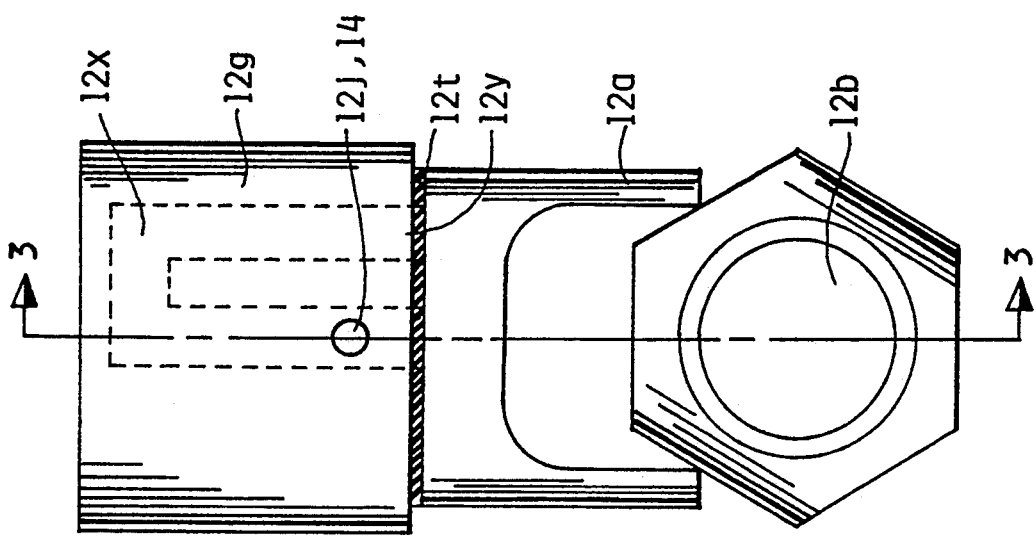

AUTOMATIC FLUID FLOW SENSOR AND FLUID SHUT-OFF SYSTEM

TECHNICAL FIELD

The invention pertains to the general field of fluid control systems and more particularly to a system that automatically detects a fluid flow and automatically shuts off the flow after a preset time has elapsed.

BACKGROUND ART

Most modern single dwellings and apartments/commercial buildings are provided with water from a central water supply source. Form this source the water is conventionally distributed through a structure-external main water valve, a pressure regulator and subsequently is fed into the building's internal water distribution plumbing which includes a plurality of user-controlled faucets or water valves.

In such a water supply and water distribution system if a rupture occurs in one or more of the internal primary water pipes, the expelled water can only be stopped by closing the structure-external main water valve. If no one is present to detect a flooding condition, the flooding will continue until such time that the main water valve is closed. There is presently no practical method or components available to automatically sense an abnormal water flow condition and to automatically shut-off the water supply.

The availability of an automatic water-flow sensor and water shut-off system is especially important in high-rise apartments and commercial buildings. In these structures, if a water pipe ruptures and the rupture goes undetected, as can occur when one is asleep or during a holiday or weekend, not only will the floor where the rupture occurred flood but the water will also drain to lower floors. This drainage will then cause additional damage to equipment, furniture as well as to the building structure.

A search of the prior art did not disclose any patents that read directly on the claims of the instant invention however, the following U.S. patents were considered related:

| U.S. Pat. No. | INVENTOR | ISSUED |
| --- | --- | --- |
| 4,921,209 | Moineau | 1 May 1990 |
| 4,823,414 | Piersimoni | 25 April 1989 |
| 4,445,238 | Maxhimer | 1 May 1984 |
| 4,069,838 | Hansen | 24 January 1978 |

The Moineau patent discloses a dual-solenoid operated water control valve that operates in combination with a pair of timers to control the length of time a bather can use a shower. The first timer controls the length of time water flows through the shower by energizing and de-energizing the solenoids. The second timer prevents the solenoids from being energized for a predetermined time after the first timer has turned off the water. Thus, preventing the shower from being turned on again until the time period has elapsed.

The Piersimoni patent discloses a system for automatically providing the flow of water to a sink faucet in response to an object being placed in the sink. The flow is controlled by a light source-photosensor pair positioned on the sink so that the light beam of the photosensor is focused at a point intersecting the path of the fluid from the faucet. An electronics circuit and valve are provided which actuate and then cut-off the water flow in response to an object under the faucet reflecting light from the light source to the photosensor. Additional circuits terminates the water flow after a predetermined period has timed out.

The Maxhimer patent dislose an apparatus that controls the water level in a swimming pool. The apparatus includes a water level sensing system located remotely from the swimming pool, and a control system for controlling or activating a water supply valve which in turn controls the flow of water to the swimming pool.

The Hansen patent discloses a liquid level sensor for use in filling containers. A fiber optic bundle is arranged to form a flow path for a light beam in a manner that the flow path is interrupted when the liquid level reaches a predetermined level. The fiber optic bundle is connected to a liquid loading system that automatically controls the filling of the container.

DISCLOSURE OF THE INVENTION

The automatic fluid-sensing and fluid shut-off system is designed primarily to protect single or multiple dwellings and/or commercial buildings from water damage due to broken water pipes. The system, however, may also be used to prevent water flooding damage from broken pipes in such installations as swimming pools, storage tanks and other industrial fluid carrying conduits. In addition to the safety aspect of the invention, the system also encourages the establishment of bathing and other water use habits that aid in water conservation.

The system consists basically of three major elements: a flow-sensing valve, an electric valve and an electronics control unit. The flow-sensing valve and electric valve are connected in series with and are used in combination with a conventional main water valve and pressure regulator.

The flow-sensing valve is designed to detect a low to moderate water flow. The valve includes an infrared emitter and detector that provide a no-flow signal when there is no water flow and a flow trigger signal when the flow is sensed. The electric valve is designed to be in an open configuration when it is powered and to close when power is terminated. The electronics control unit receives either the no-flow or flow trigger signal from the flow sensing valve. When the no-flow signal is received, the unit maintains the system in a quiescent state. When the trigger signal is received, indicating a water flow, the unit activates a preset timer circuit that commences a countdown. When the time lapses the timer, in combination with other circuits in the electronics control unit, provides a signal that ultimately causes the power being applied to the electric valve to terminate with no power applied, the electric valve closes and shuts-off the water supply.

The system maintains the "no water flow" condition until such time that a reset switch located on the electronics control unit is momentarily depressed. When so depressed, a "valve-open signal" is produced that once again opens the valve to allow the water flow to commence and the time circuit to reactivate. The system can also be reset by momentarily closing and then opening the water supply faucet or valve prior to the lapsing of the preset time in the timer.

In view of the above disclosure, it is the primary object of the invention to detect a water flow and to allow the water flow to continue for a preset time before the flow is automatically terminated. With the primary object in mind, it is also an object of the invention to provide a system that:

has indoor as well as outdoor applicability, can prevent major damage from overflooding bathtubs, sinks, washing machines, water heaters, toilets, etc.

will shut-off the main water pipe during an earthquake, is fail safe in that if electric power is interrupted, as could occur during an earthquake, the system will automatically shut off the water supply allows the preset time to be selected i.e., from one minute to thirty-one minutes, can be applied in combination with existing security systems, can be turned off, in an emergency, to thus prevent any water from entering a building, and conserves water.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 2 is an end elevational view of the flow sensing valve.

FIG. 3 is a cross sectional side elevational view of the flow sensing valve taken across section 3—3 of FIG. 2

BEST MODE FOR CARRYING OUT THE INVENTION

Figure 1:
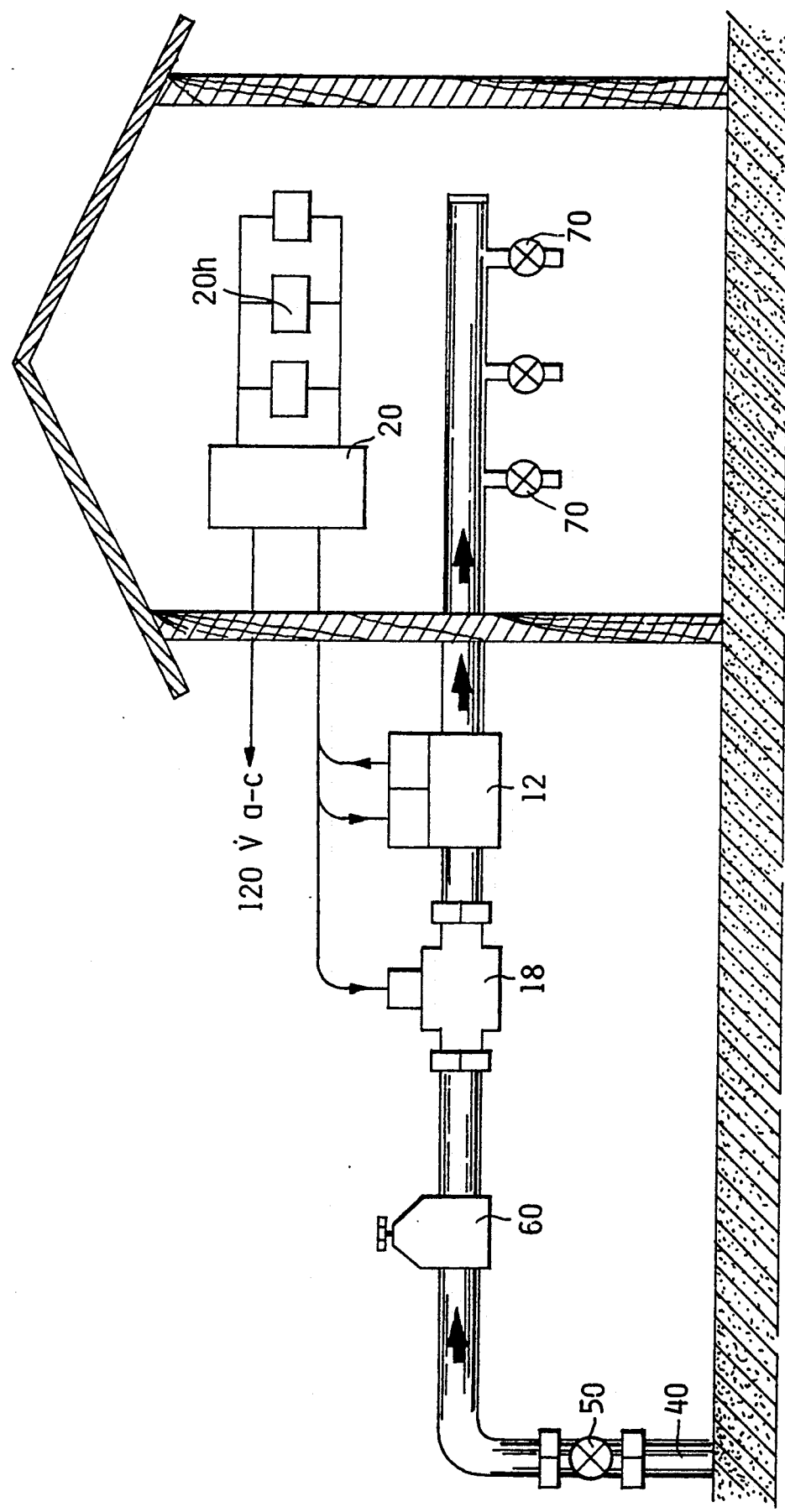
FIG. 1 is an overall schematic of the automatic fluid-flow sensor and fluid shut-off system as would be installed in a building and connected into a conventional main water valve, pressure regulator and a plurality of user-operated water supply valves.

The best mode for carrying out the automatic fluid-flow sensor and fluid shut-off system is presented in terms of a preferred embodiment that is primarily designed to automatically detect, time and shut off a fluid flow at the expiration of a preset time.

The preferred embodiment, as shown in FIGS. 1 through 7 is comprised of the following five major elements: a fluid-sensing valve 12, a light transmitting device which preferably is a infrared emitter 14, a light receiving device which is preferably an infrared detector 16, an electric valve 18 and an electronics control unit 20. The system operates with a conventional main water valve 50, a pressure regulator 60 and a plurality of user-controlled water supply valves 70. Although the system 10 can function with a variety of fluids, for the purpose of this disclosure only water will be covered.

The automatic fluid-flow sensor and fluid shut-off system 10 as normally installed in a building is shown in FIG. 1. The system functions in combination with a water supply source that is applied through a main water pipe 40 connected in-line with the main water valve 50 and pressure regulator 60. Sequentially in-line with the pressure regulator 60, is the system's electric valve 18 and flow sensing valve 12 from where the water is piped into the building and used by opening one or more of the faucets or water supply valves 70. The electronics control unit (ECU) 20, as also shown in FIG. 1, is generally located inside a building at some convenient location that allows the system to be turned on, off or reset. Once the system is turned on, water will only flow for the time period that has been preset in the ECU. After the flow has terminated, the flow may be restarted by depressing a reset switch 20t located on the ECU. Each time the reset switch is depressed, the preset time commences from the beginning. For convenience, as shown in FIG. 1, several reset switches 20t may be connected in parallel and located in several locations such as in a shower stall or kitchen.

The core of the automatic fluid-sensor and fluid shut-off system 10 is the fluid sensing valve 12 which is shown in FIGS. 2, 3, 4 and 5. The valve 12 consists of a valve housing 12a that may be made of plastic or metal but is preferably made of a plastic having a wall thickness of 0.125 inches (0.318 cm). The valve housing has an inlet port 12b on one end and on outlet port 12c on the other end. Near the center of the housing is also located a vertically oriented valve guide cap port 12d. To facilitate the attachment of the external interfacing water pipes, the inlet and outlet ports are threaded. Likewise, the valve guide cap port 12d is also threaded to allow a valve guide cap 12g to be threadably attached. To assure a water tight seal between the port and cap, a water sealent gasket 12t may be installed as shown in FIGS. 2 and 3.

The valve guide cap 12g includes a vertically oriented valve guide cavity 12h and a horizontal bore 12i that includes on one side a first port section 12j and on the opposite side a concentric second port section 12k. The two ports, as shown in FIG. 3, interface with an aperture section 12m that is centered with respect to the two bores and that intercepts the valve guide cavity 12h. To allow the infrared emitter 14 and infrared detector 16 to provide a narrow infrared beam, as described infra, the diameter of the aperture is made smaller than the diameter of the two bores 12j, 12k.

Located within the housing, between the inlet port 12b and the outlet port 12c is an inlet/outlet separator 12e that isolates the valve input from the output. Between the area bordered by the inlet/outlet separator 12e and a protrusion on the inlet port 12b is configured a valve seat 12f that serves as the seat for the control valve 12n.

The control valve 12n, which is the only movable element of the flow sensing valve 12, consists of a seat disk 12p that has on its upper surface an upwardly extending valve stem 12q. The control valve is designed to rise from its valve seat 12f when a low to moderate fluid flow is passing through the flow-sensing valve 12 and to return to the valve seat when the fluid flow stops. The valve's rising sensitivity to the fluid flow is determined by the diameter of the aperture section 12m and the length of the valve stem 12q.

Figure 5:
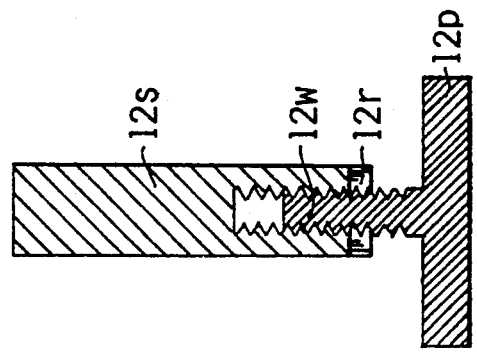
FIG. 5 is a cross sectional side view of a two-piece control valve.

The control valve 12n may be constructed as a single unit as shown in FIG. 3 or made in two pieces as shown in FIG. 5. In the two piece design, the seat disk 12p is made with an upwardly extending threaded rod 12w into which is threaded a locknut 12r. A threaded valve stem 12t is then threaded into the threaded rod 12w and its height is adjusted to provide an optimum sensitivity to the rising of the control valve. Once the optimum level is determined, the locknut 12r is tightened against the end of the valve stem to lock-in the set length. In either the single or two-piece control valve designs, the upper surface of the seat disk 12p may also include a cylindrical groove 12u, as shown in FIG. 3, into which is inserted a weight washer 12v. The weighted washer aids in providing a further refinement adjustment for setting the control valve sensitivity.

Figure 4:
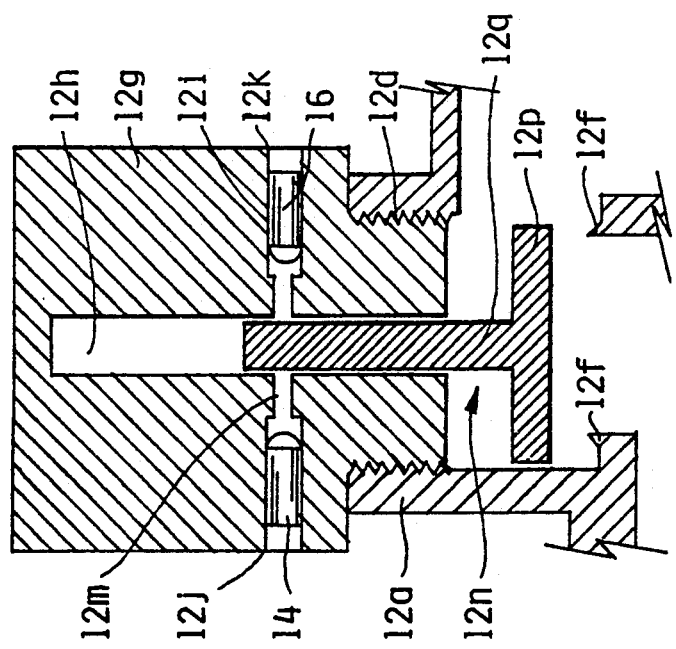
FIG. 4 is a partial fragmentary cross section of the control valve with the valve stem positioned above the aperture section as would be positioned when water is flowing through the flow sensing valve.

The seat disk 12p is sized to rest on the valve seat 12f and the valve stem is sized to slideably move within the vertical valve guide cavity 12h located on the valve guide cap 12g. When there is no water flow through the flow sensing valve 12, the upper end of the valve stem 12q is located below the aperture section 12m. Conversely, when there is a flow the force of the flow causes the seat disk 12p to rise from its valve seat 12f to then cause the upper end of the valve stem 12q to move upwards across the path of the aperture section, as shown in FIG. 4, to thus produce a flow trigger signal that is applied to the ECU 20 as described infra.

In order for the flow-sensing valve 12 to function properly, it is necessary that a means be provided to assure that the control valve 12n moves freely within the valve guide cavity 12h in both its upstroke and downstroke.

One such means is to include in the valve guide cap 12g, a water relief cavity 12x as shown in FIG. 2. This cavity commences where it intercepts the valve guide cavity 12h at its upper end, extends horizontally outwards, then extends vertically downwards, substantially parallel to the valve guide cavity 12h and terminates at an exit port 12y that interfaces with the outlet port 12c. When the control valve is in its upstroke, any water in the cavity 12h is forced upwardly by the valve stem 12q and is ejected into the relief cavity 12x and out the exit port 12y into the outlet port 12c. This action prevents a partial vacuum from forming within the valve guide cavity 12h that could impede the upward travel of the control valve 12n. Conversely, when the control valve 12n is in its downstroke, the cavity 12x fills with water and allows the water at the top of the valve stem 12q to aid in allowing the control valve to drop.

Another means that may be employed to assure a smooth control valve 12n travel is to include in the valve stem a plurality of longitudinal flutes (not shown) around the diameter of the valve stem 12q. The flutes allow any water accumulation in the valve guide cavity 12h, present in either the valve's upstroke or downstroke, to flow through the flutes to thus prevent the water from affecting the valve travel.

The electronics portion of the flow sensing valve 12 consists of the infrared emitter 14 and the infrared detector 16. As shown in FIG. 3, the emitter 14 is located within the first port section 12j and the detector is concentrically located within the second port section 12k. When the upper end of the valve stem 12q is positioned below the aperture section 12m (no flow present) as shown in FIG. 3, the infrared light beam from the infrared emitter 14 is received by the infrared detector 16 to complete an optical path under this condition a no-flow signal is produced that is applied to the electronics control unit 20. Conversely, when the valve stem, raises above the aperture section 12m (flow present), as shown in FIG. 4, the infrared optical path is broken causing the infrared detector to produce a flow trigger signal that is also applied to the electronics control unit 20.

Figure 6:
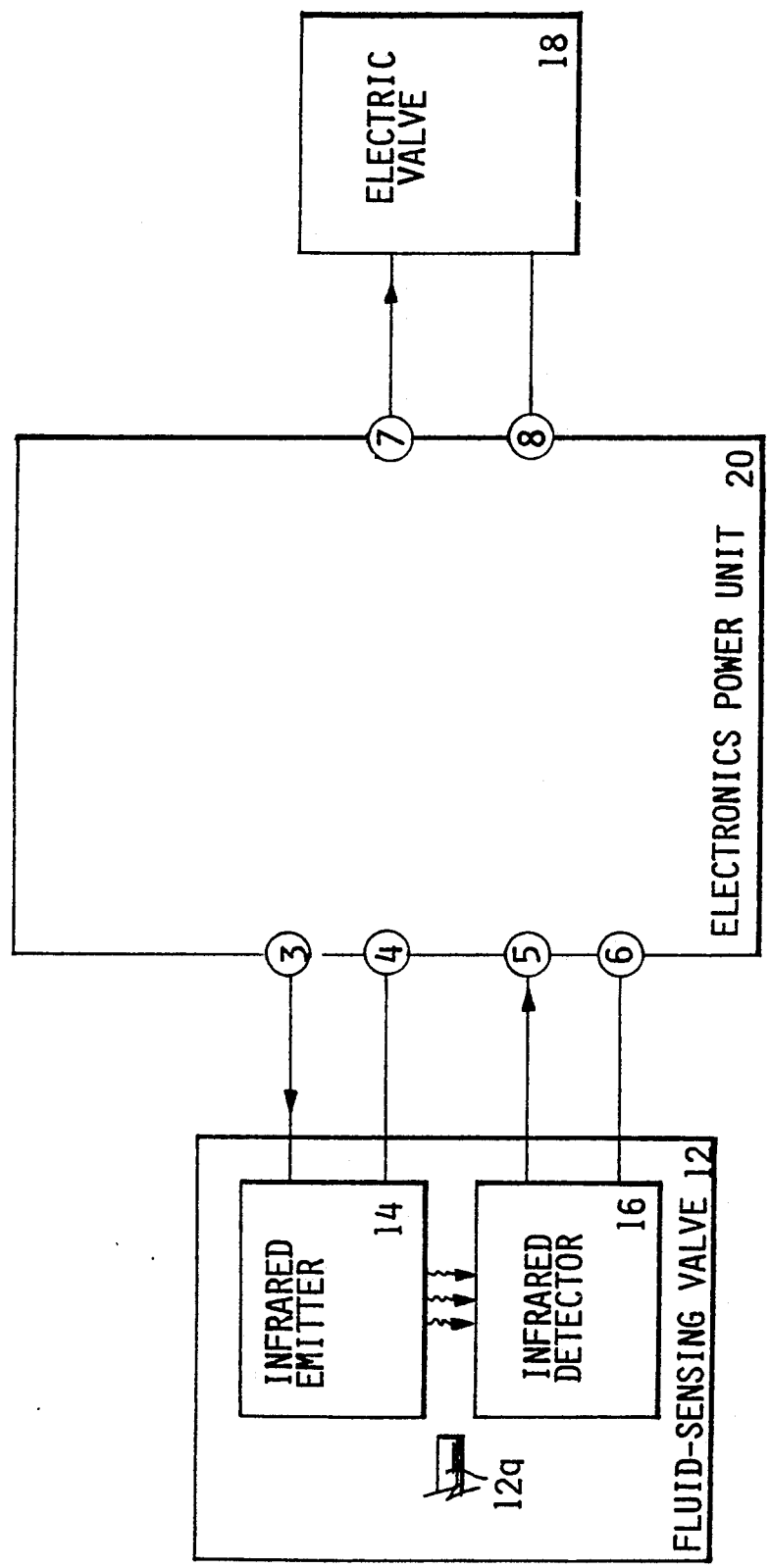
FIG. 6 is an overall schematic of the electronics control unit as would be electrically connected to the flow sensing valve and the electrical valve.
Figure 7:
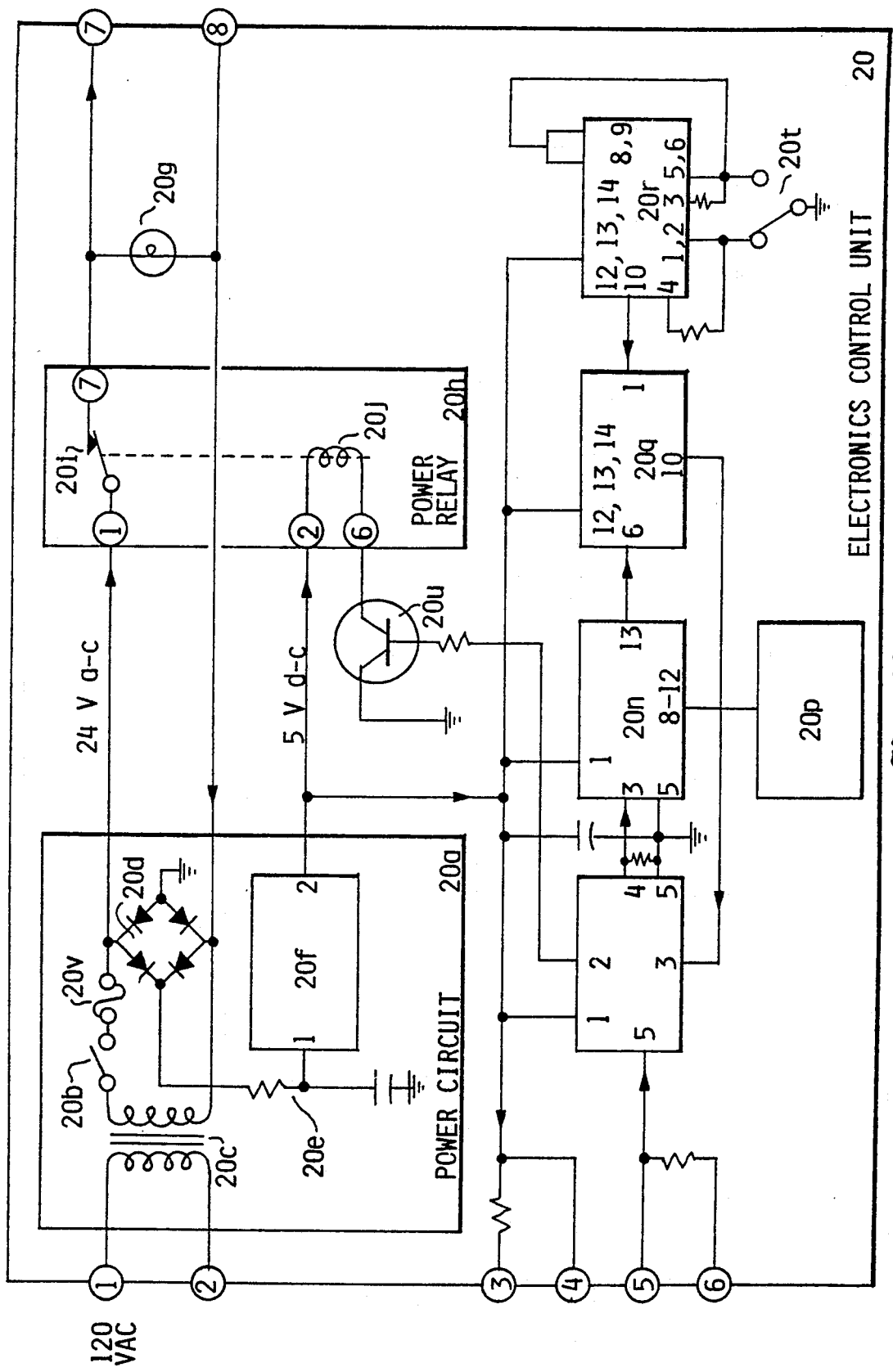
FIG. 7 is a block diagram of the electronics control unit.

The electronics/electrical portion of the system 10 is shown overall in FIG. 6 with the details of the electronics control unit (ECU) 20 shown in FIG. 7. The ECU is designed to be housed in a single enclosure that includes a printed circuit board that has attached all the electronics/electrical devices and interconnections. The ECU 20 is comprised of the following major elements: a power circuit 20a that includes a power switch 20b, a step-down transformer 20c, a bridge rectifier 20d, a filter network 20e and a voltage regulator 20f; a power-on lamp 20g; a power relay 20h that includes a set of normally closed contacts 20i and a coil 20j; a buffer/-driver circuit 20m, a programmable digital delay timer 20n; a switching network 20p; a quad 2-input NOR gate 20q; a quad 2-input NAND gate 20r; a reset switch 20t and a relay driver NPN transistor 20u. In designing the ECU, the following electronics circuits were used:

| ITEM NO. | COMMERCIAL PART NO. |
| --- | --- |
| 20f | 7805 |
| 20m | 4050 |
| 20n | 7210 |
| 20q | 4001 |
| 20r | 4011 |
| 20u | 2N222 |

The electronics control unit becomes operational when connected at terminal 1 and 2 to a source of 120 volts a-c and the power switch 20b is closed. The 120 volts a-c is applied through step down transformer 20c where the voltage is dropped to 24 volts a-c and then applied, via a fuse 20v, to the pole contact of the normally closed relay contact set 20i. The a-c output of the transformer 20c is also applied across the bridge rectifier 20d that rectifies and drops the voltage across a filter network 20e. From the filter network, the voltage is applied to a voltage regulator 20f which produces a regulated 5 volt d-c power. The regulated 5 volt d-c is used to energize the coil 20j of the power relay 20h the infrared emitter 14 and the electronic circuits of the system as shown in FIG. 7.

Before describing the operation of the system 10 a brief description is given of the major system devices that control the operation and logic sequence.

The starting system signal is produced by the combination of the infrared emitter 14 and infrared detector 16 located in the flow sensing valve as previously described. When the emitter 14 is powered, it produces an infrared light beam 14a, as shown in FIG. 6, that is received by the detector 16. When so received, it is indicative that there is no water flow through the fluid sensing valve 12 and that the 5-volt d-c no-flow output signal is being produced by the detector. Conversely, when a water flow is sensed by the flow-sensing valve 12, the valve stem 12q rises, as shown in FIG. 4, to a level that causes the infrared light beam to be broken. At this occurrence, the infrared detector produces a 0-volt d-c flow trigger signal.

Either the no flow or flow trigger signal is inputted to pin 5 of the buffer/driver circuit 20m. When the no flow signal is applied, the circuit 20m is disabled and remains in a quiescent state. However, when the flow trigger signal is received, indicating a water flow through the flow-sensing valve 12, the buffer/driver 20m is enabled and produces a high to low level trigger signal that is controlled in a schmidt trigger across device pins 4 and 5. The schmidt trigger sets and shapes the flow trigger signal such that when the signal is transitioning from a high level to a low level when the signal reaches approximately 2-volts, the signal is caused to drop quickly to a low-level 0-volts. The low level output from the circuit 20m is applied through device pin 4 to device pin 3 of the programmable digital delay timer 20n where the signal is latched.

The timer 20m is operated in a delayed operational mode which causes a retriggerable delay in turning on the output on the negative edge of the flow trigger signal. The output of the timer turns off immediately when there is a positive transition at the trigger input. The time delay between the trigger input and the output is determined by selecting a weighting factor at device pins 8 through 12. Pin 12 has a value =1, while 11=2, pin 10=4, pin 9=8 =16. The selection is made by a switching network 20p that controls the grounding of each pin 8 through 12. For example, for a weighting factor of 25, pins 8, 9, and 12 would be tied to ground.

When the water flow has exceeded the preset time interval the timer 20n produces an output logic signal that transitions from a low to a high output. This high output signal is applied to device pin 6 of the quad 2-input NOR gate 20q that functions as a set/reset latch that allows the circuit 20q to latch when the timer has timed-out. The output of circuit 20q is a high output latching signal. The signal is applied from the device pin 10 back to pin 3 of the buffer/driver circuit 20m where the signal is further applied through a buffer and outputted through device pin 2 of the circuit 20m. The high output signal is ultimately applied to the base of NPN transistor 20u which turns on the transistor that then allows the 5-volt d-c voltage from the power circuit 20a to energize the power relay 20h.

The final circuit described is the quad 4-input NAND gate 20r. This circuit functions as a set/reset device that is controlled by a momentary-on switch 20t. When the switch 20t is in switch position 1, the output of pin 10 of the device 20r is grounded. By momentarily depressing the switch 20t the ground is removed from the NOR gate input at device pins 1 and 2 which allows a reset signal to be applied through device pin 10 that resets the input of the NOR gate 20q. This occurrence once again allows the circuit 20q to provide a high output latching signal that is applied to pin 3 of the buffer/drive circuit 20m to function as previously described.

The operation of the automatic fluid sensing and fluid shut-off device 10 is best described in terms of its four modes of operation that are applicable to a system as would be installed in either a single or multiple dwelling building or a commercial/industrial building. The four operational modes include: a water available mode, a water flow-on mode, a water flow-off mode, and a water flow reset mode. Each mode is described with reference to FIGS. 1, 6 and 7.

In the water available mode the main water valve 50 is on but none of the water supply faucets or valves 70 have been turned on by a user. Therefore, there is no water flowing through the flow sensing valve 12 and the infrared emitter 14 is providing an infrared beam that is being detected by the infrared detector 16. When the detector 16 is receiving the infrared beam, it produces a 5 volt d-c no-flow signal that is applied to pin 5 of the driver/buffer circuit 20m. Since the detector signal is at a high output, the trigger 20m is not activated causing the follow-on control logic circuits to remain in a disabled quiescent state. In this mode, the power control relay 20u is deenergized allowing the 24 volts a-c power from the power circuit 20a to be applied, via the relay's normally closed relay contacts 20i, to the electric valve 18 to thus maintain the valve in an open position.

In the water flow-on mode, one or more of the water supply valves 70, as shown in FIG. 1, have been turned on by a user. Water is therefore flowing through the flow sensing valve 12 causing the control valve 12n to rise and allow the valve stem 12q to break the path of the infrared beam. At this occurrence, the high level signal being applied from the detector 16 to pin 5 of the driver/buffer circuit 20m goes low which enables the circuit 20m which, in turn, produces a low level signal that is applied to and starts the count down on the programmable timer 20n as set by the switching network 20p. While the timer is counting down, it produces no output signal. Therefore, the 2-input NOR gate 20q remains disabled in its quiescent state. During the water flowing mode, the relay driver transistor 20u is also off which keeps the relay contacts 20i of the power control relay 20h closed. The closed contacts allow the 24 volts a-c remain applied to the electric valve 18 to keep the valve open and the water flowing.

In the water flow-off mode, the preset time in the programmable timer 20n has lapsed (counted down) allowing a high level signal to be applied to pin 6 of the quad 2-input NOR gate 20q. The circuit 20q functions as a set/reset latch that latches and provides a high level signal that is fed back to the driver/buffer circuit 20m. From this circuit, a signal is applied to the base of the relay drive transistor 20u that turns the transistor on. With the transistor on, a signal path is completed that allows the 5-volt d-c power from the power circuit 20a to energize the coil 20j of the power control relay 20h which then causes the relay contacts 20i to open. With the contacts open, the 24 volts a-c that has been keeping the electrical valve 18 open is terminated which causes the electric valve to close and stop the water flow.

The reset mode is used to restart the water flow after the flow has been stopped by the system 10. To perform the reset function, the reset switch 20t, which consists of a single-pole double-throw momentary-on switch that has its pole connected to ground, is momentarily depressed. When so depressed, the ground connection is removed from device pins 1 and 3 and applied to device pins 5 and 6 which causes a reset signal to be applied to pin 1 of the quad 2-input NOR gate 20q. This gate, in turn, generates a low-level feedback signal that is applied to and causes the driver/buffer circuit 20m to remove the signal that has turned on the relay driver transistor 20u. With the signal removed, the transistor turns-off causing the relay contacts 20i to close which then allows the 24 volt a-c power to turn-on the electric valve 18.

The system 10 may also be restarted by momentarily shutting off the water supply before the expiration of the preset time. One practical way to easily turn the water on and off, in a shower, is to use a water saving shower head. This type of head has a push-button controlled slide valve that when pushed in one direction, the water turns off and when pushed in the opposite direction, the water is turned back on.

In this operational mode, when the water is shut off, the water through the flow-sensing valve 12 stops causing the control valve to drop which, in turn, allows the infrared detector 16 to produce a 5-volt d-c no-flow signal that is applied to the driver/buffer circuit 20m as described in the water available mode. When the water is turned back on, the timing sequence is restarted as described in the water flow-on mode.

While the invention has been described in complete detail and pictorially shown in the accompanying drawings, it is not to be limited to such details, since many changes and modifications may be made in the invention without departing from the spirit and the scope thereof. For example, although the system is primarily designed for protecting inhabitable buildings, it also has utility in outdoor applications. Such applications include controlling the fluid level of swimming pools and storage tanks. Hence, it is described to cover any and all modifications and forms which may come within the language and scope of the appended claims.

I claim:

1. An automatic fluid-flow sensor and fluid shut-off system that functions in combination with a water supply source applied through a main water pipe connected in-line with a main water valve and pressure regulator, said system comprising:
   (a) an electrical valve connected in line with said main water valve,
   (b) a flow-sensing valve connected in-line with said electrical valve, where said flow sensing valve includes an optical path and means including a movable element that remains below the optical path when there is no fluid flow through said flow-sensing valve which causes a no-flow signal to be produced and that interrupts the optical path when there is a fluid flow which causes a flow trigger signal to be produced, and
   (c) an electronics control unit having the means to:
      (1) control the application of an a-c voltage that turns on said electrical valve,
      (2) receive and process the no-flow or flow trigger signals from said flow sensing valve,
      (3) start a programmable timer circuit that is directly coupled to receive the no-flow and flow trigger signals from said flow-sensing valve such that when the flow trigger signal is received, upon the lapsing of a preset time, a signal, that is free of microprocessor control, is produced that removes the a-c power being applied to said electrical valve which causes said valve to close and stop the fluid flow.

2. An automatic fluid-flow sensor and fluid shut-off system that functions in combination with a water supply source applied through a main water pipe connected in-line with a main water valve and pressure regulator, said system comprising:
   A. an electrical valve connected in line with said main water valve,
   B. a flow-sensing valve connected in-line with said electrical valve, where, said flow sensing valve comprises:
      (a) a valve housing having an inlet port, an outlet port and a vertically oriented valve guide cap port,
      (b) an inlet/outlet separator located within said valve housing between the inlet port and the outlet port,
      (c) a valve seat located within an area bordered by said inlet/outlet separator and a protrusion on the inlet port,
      (d) a valve guide cap affixed to the valve guide port, said cap having:
         (1) a vertically oriented valve guide cavity, and
         (2) a horizontal bore having a first port section and a concentric second port section that interface with an aperture section that is centered and that intercepts the valve guide cavity,
      (e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section,
      (f) means to allows said control valve to move freely within the valve guide cavity in both its upstroke and downstroke,
      (g) a light transmitting device located within the first port section,
      (h) a light receiving device located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal where the two signals are applied to said electronics control unit for further processing,
   C. an electronics control unit having the means to:
      (a) control the application of an a-c voltage that turns on said electrical valve,
      (b) receive and process the no-flow or flow trigger signals from said flow sensing valve,
      (c) start a programmable timer circuit when the flow trigger signal is received, that upon the lapsing of a preset time, a signal is produced that energizes a power relay that when energized removes the a-c power being applied to said electrical valve which causes said valve to close and stop the fluid flow, and
      (d) a reset circuit having the means to produce a reset signal that allows said programmable timer to restart after its preset time has lapsed.

3. An automatic fluid-flow sensor and fluid shut-off system that functions in combination with a water supply source applied through a main water pipe connected in-line with a main water valve and pressure regulator, said system comprising:
   A. an electrical valve connected in line with said main water valve,
   B. a flow-sensing valve connected in-line with said electrical valve, where, said flow sensing valve comprises:
      (a) a valve housing having an inlet port, an outlet port and a vertically oriented valve guide cap port,
      (b) an inlet/outlet separator located within said valve housing between the inlet port and the outlet port, (c) a valve seat located within an area bordered by said inlet/outlet separator and a protrusion on the inlet port,
(d) a valve guide cap affixed to the valve guide port, said cap having:
  (1) a vertically oriented valve guide cavity, and
  (2) a horizontal bore having a first port section and a concentric second port section that interface with an aperture section that is centered, intercepts the valve guide cavity, and has a smaller diameter than the diameter of said first port section and second port section,
(e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section,
(f) means to allow said control valve to move freely within the valve guide cavity in both its upstroke and downstroke,
(g) a light transmitting device located within the first port section,
(h) a light receiving device located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal where the two signals are applied to said electronics control unit for further processing, C. an electronics control unit having the means to:
  (a) control the application of an a-c voltage that turns on said electrical valve,
  (b) receive and process the no-flow or flow trigger signals from said flow sensing valve,
  (c) start a programmable timer circuit when the flow trigger signal is received, that upon the lapsing of a preset time, a signal is produced that energizes a power relay that when energized removes the a-c power being applied to said electrical valve which causes said valve to close and stop the fluid flow, and
  (d) a reset circuit having the means to produce a reset signal that allows said programmable timer to restart after its preset time has lapsed.

4. An automatic fluid-flow sensor and fluid shut-off system that functions in combination with a water supply source applied through a main water pipe connected in-line with a main water valve and pressure regulator, said system comprising:
A. an electrical valve connected in line with said main water valve.
B. a flow-sensing valve connected in-line with said electrical valve, where, said flow sensing valve comprises:
  (a) a valve housing having an inlet port, an outlet port and a vertically oriented valve guide cap port,
  (b) an inlet/outlet separator located within said valve housing between the inlet port and the outlet port,
  (c) a valve seat located within an area bordered by said inlet/outlet separator and a protrusion on the inlet port,
  (d) a valve guide cap affixed to the valve guide port, said cap having:
    (1) a vertically oriented valve guide cavity, and
    (2) a horizontal bore having a first port section and a concentric second port section that interface with an aperture section that is centered, intercepts the valve guide cavity,
  (e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section where said control valve moves freely within the valve guide cavity by having a valve guide cap that further comprises a water relief cavity, where said cavity intercepts the valve guide cavity at its upper end, extends horizontally outwards, extends vertically downwards, substantially parallel to the valve guide cavity, and exits out an exit port into the outlet port of said flow-sensing valve,
  (f) means to allow said control valve to move freely within the valve guide cavity in both its upstroke and downstroke,
  (g) a light transmitting device located within the first port section,
  (h) a light receiving device located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal where the two signals are applied to said electronics control unit for further processing,
C. an electronics control unit having the means to:
  (a) control the application of an a-c voltage that turns on said electrical valve,
  (b) receive and process the no-flow or flow trigger signals from said flow sensing valve,
  (c) start a programmable timer circuit when the flow trigger signal is received, that upon the lapsing of a preset time, a signal is produced that energizes a power relay that when energized removes the a-c power being applied to said electrical valve which causes said valve to close and stop the fluid flow, and
  (d) a reset circuit having the means to produce a reset signal that allows said programmable timer to restart after its preset time has lapsed.

5. An automatic fluid-flow sensor and fluid shut-off system that functions in combination with a water supply source applied through a main water pipe connected in-line with a main water valve and pressure regulator, said system comprising:

A. an electrical valve connected in line with said main water valve,

B. a flow-sensing valve connected in-line with said electrical valve, where, said flow sensing valve comprises:
   (a) a valve housing having an inlet port, an outlet port and a vertically oriented valve guide cap port,
   (b) an inlet/outlet separator located within said valve housing between the inlet port and the outlet port,
   (c) a valve seat located within an area bordered by said inlet/outlet separator and a protrusion on the inlet port,
   (d) a valve guide cap affixed to the valve guide port, said cap having:
      (1) a vertically oriented valve guide cavity, and
      (2) a horizontal bore having a first port section and a concentric second port section that interface with an aperture section that is centered, intercepts the valve guide cavity,
   (e) a control valve consisting:
      (1) a seat disk sized to rest on the valve stem and having an upwardly extending threaded rod,
      (2) a lock nut threaded into said threaded rod, and
      (3) a threaded valve stem that is threaded into said threaded rod, above the locknut, to allow the valve stem to be set at a length that provides optimum sensitivity at which length the locknut is tightened against the end of the valve stem to lock-in the set length, where the stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section,
   (f) means to allow said control valve to move freely within the valve guide cavity in both its upstroke and downstroke,
   (g) a light transmitting device located within the first port section,
   (h) a light receiving device located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal where the two signals are applied to said electronics control unit for further processing, C. an electronics control unit having the means to:
   (a) control the application of an a-c voltage that turns on said electrical valve,
   (b) receive and process the no-flow or flow trigger signals from said flow sensing valve,
   (c) start a programmable timer circuit when the flow trigger signal is received, that upon the lapsing of a preset time, a signal is produced that energizes a power relay that when energized removes the a-c power being applied to said electrical valve which causes said valve to close and stop the fluid flow, and
   (d) a reset circuit having the means to produce a reset signal that allows said programmable timer to restart after its preset time has lapsed.

6. An automatic fluid-flow sensor and fluid shut-off system that functions in combination with a water supply source applied through a main water pipe connected in-line with a main water valve and pressure regulator, said system comprising:

A. an electrical valve connected in line with said main water valve,

B. a flow-sensing valve connected in-line with said electrical valve, where, said flow sensing valve comprises:
   (a) a valve housing having an inlet port, an outlet port and a vertically oriented valve guide cap port,
   (b) an inlet/outlet separator located within said valve housing between the inlet port and the outlet port,
   (c) a valve seat located within an area bordered by said inlet/outlet separator and a protrusion on the inlet port,
   (d) a valve guide cap affixed to the valve guide port, said cap having:
      (1) a vertically oriented valve guide cavity, and
      (2) a horizontal bore having a first port section and a concentric second port section that interface with an aperture section that is centered, intercepts the valve guide cavity,
   (e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section,
   (f) means to allow said control valve to move freely within the valve guide cavity in both its upstroke and downstroke,
   (g) a light transmitting device comprising, an infrared emitter located within the first port section,
   (h) a light receiving device comprising an infrared detector located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal, C. an electronics control unit having the means to:
   (a) control the application of an a-c voltage that turns on said electrical valve, (b) receive and process the no-flow or flow trigger signals from said flow sensing valve, (c) start a programmable timer circuit when the flow trigger signal is received, that upon the lapsing of a preset time, a signal is produced that energizes a power relay that when energized removes the a-c power being applied to said electrical valve which causes said valve to close and stop the fluid flow, and (d) a reset circuit having the means to produce a reset signal that allows said programmable timer to restart after its preset time has lapsed.

7. An automatic fluid-flow sensor and fluid shut-off system that functions in combination with a water supply source applied through a main water pipe connected in-line with a main water valve and pressure regulator, said system comprising:

A. an electrical valve connected in line with said main water valve,

B. a flow-sensing valve connected in-line with said electrical valve, where, said flow sensing valve comprises:

(a) a valve housing having an inlet port, an outlet port and a vertically oriented valve guide cap port, (b) an inlet/outlet separator located within said valve housing between the inlet port and the outlet port, (c) a valve seat located within an area bordered by said inlet/outlet separator and a protrusion on the inlet port, (d) a valve guide cap affixed to the valve guide port, said cap having:

(1) a vertically oriented valve guide cavity, and (2) a horizontal bore having a first port section and a concentric second port section that interface with an aperture section that is centered, intercepts the valve guide cavity, (e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section, (f) means to allow said control valve to move freely within the valve guide cavity in both its upstroke and downstroke, (g) a light transmitting device comprising, an infrared emitter located within the first port section, (h) a light receiving device comprising an infrared detector located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal, C. an electronics control unit comprising:

(a) a power circuit having the means to provide an a-c voltage and a regulated d-c voltage, (b) a relay driver transistor, (c) a power relay having a coil connected in series between the regulated d-c voltage from said power circuit and said relay driver transistor, where said relay includes a set of normally closed contacts connected in series between the a-c voltage from said power circuit where when said relay is deenergized the a-c voltage is applied to said electrical valve to maintain said valve in an open position to allow fluid flow and conversely when said valve is energized, the contact set opens causing said electrical valve to open and stop the fluid flow, (d) a buffer/driver circuit that receives either a no-flow signal or a flow trigger signal from said infrared detector where when the no-flow signal is received, indicating no fluid flow, said buffer/driver circuit is disabled causing the follow-on control logic circuits to remain in a disabled quiescent state, conversely, when the flow trigger signal is received, indicating fluid flow, said buffer is enabled and produces a high to low trigger signal, (e) a switching network, (f) a programmable timer that upon receiving the trigger signal from said buffer/driver circuit commences counting down from a preset time as set by said switching network, where when said preset time has lapsed, said timer produces an output logic signal, (g) a quad 2-input NOR gate that latches when the output logic signal from said programmable timer is received, where when so latched, a latching signal is produced and fed back to said buffer/driver circuit from where the signal is further applied to the base of said relay driver transistor causing said transistor to turn on and allow the regulated d-c voltage from said power circuit to energize said power relay and open the relay contacts, with the contacts open the a-c voltage that has been keeping said electric valve open is terminated which causes said electric valve to close and stop the water flow, and (h) a reset circuit having the means to produce a reset signal that allows said programmable timer to restart after its preset time has lapsed.

8. An automatic fluid-flow sensor and fluid shut-off system that functions in combination with a water supply source applied through a main water pipe connected in-line with a main water valve and pressure regulator, said system comprising:

A. an electrical valve connected in line with said main water valve,

B. a flow-sensing valve connected in-line with said electrical valve, where: said flow sensing valve comprises:

(a) a valve housing having an inlet port, an outlet port and a vertically oriented valve guide cap port, (b) an inlet/outlet separator located within said valve housing between the inlet port and the outlet port, (c) a valve seat located within an area bordered by said inlet/outlet separator and a protrusion on the inlet port, (d) a valve guide cap affixed to the valve guide port, said cap having:
  (1) a vertically oriented valve guide cavity, and
  (2) a horizontal bore having a first port section and a concentric second port section that interface with an aperture section that is centered, intercepts the valve guide cavity,
(e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section,
(f) means to allow said control valve to move freely within the valve guide cavity in both its upstroke and downstroke,
(g) a light transmitting device comprising, an infrared emitter located within the first port section,
(h) a light receiving device comprising an infrared detector located within said second port section, where when said upper end of said valve stem is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce a flow trigger signal, C. an electronics control unit comprising:
  (a) a power circuit having the means to provide an a-c voltage and a regulated d-c voltage,
  (b) a relay driver transistor,
  (c) a power relay having a coil connected in series between the regulated d-c voltage from said power circuit and said relay driver transistor, where said relay includes a set of normally closed contacts connected in series between the a-c voltage from said power circuit where when said relay is deenergized the a-c voltage is applied to said electrical valve to maintain said valve in an open position to allow fluid flow and conversely when said valve is energized, the contact sets opens causing said electrical valve to open and stop the fluid flow,
  (d) a buffer/driver circuit that receives either a no-flow signal or a flow trigger signal from said infrared detector where when the no-flow signal is received, indicating no fluid flow, said buffer/driver circuit is disabled causing the follow-on control logic circuits to remain in a disabled quiescent state, conversely, when the flow trigger signal is received, indicating fluid flow, said buffer is enabled and produces a high to low trigger signal,
  (e) a switching network,
  (f) a programmable timer that upon receiving the trigger signal from said buffer/driver circuit commences counting down from a preset time as set by said switching network, where when said preset time has lapsed, said timer produces an output logic signal,
  (g) a quad 2-input NOR gate that latches when the output logic signal from said programmable timer is received, where when so latched, a latching signal is produced and fed back to said buffer/driver circuit from where the signal is further applied to the base of said relay driver transistor causing said transistor to turn on and allow the regulated d-c voltage from said power circuit to energize said power relay and open the relay contacts, with the contacts open the a-c voltage that has been keeping said electric valve open is terminated which causes said electric valve to close and stop the water flow, and D. a reset circuit having the means to reset said system by restarting the water flow after the flow has been stopped by said system, said reset circuit comprising:
  (a) a reset switch consisting of single-pole double-throw momentary on switch having its pole connected to ground, and
  (b) a quad 2-input NAND gate connected to the contacts of said reset switch and having an output connected to said quad 2-input NOR gate, where when said reset switch is momentarily depressed, the ground connection normally on device pins 1 and 2 is placed on pins 5 and 6 which causes a reset signal to be applied to said quad 2-input NAND gate from where a feedback signal is applied to and causes said driver/buffer circuit to remove the signal that is maintaining said relay driver transistor in the on state, where when the transistor signal is removed, the relay contacts close to allow the a-c power to turn on said electric valve.

9. An automatic fluid-flow sensor having the means to provide a no-flow signal when no fluid flow is sensed and a flow trigger signal when a flow is sensed, where said sensor is located in series with an electric valve having an on or off mode that is controlled by an electronics control unit having the means to receive and process the non-flow and flow trigger signals, where when the no-flow trigger is received and processed by said unit, said unit allows said electric valve to remain in the open position to allow a fluid flow and conversely, when the flow-trigger signal is received by said unit it is subsequently processed by a programmable timer having a preset time that upon the lapsing of the time a signal is produced by said unit that is applied to and causes said electric valve to close and stop the fluid flow, where said fluid-flow sensor comprises:
  (a) a valve housing having an inlet port, an outlet port and a vertically oriented valve guide cap port,
  (b) an inlet/outlet separator located within said valve housing between the inlet port and the outlet port,
  (c) a valve seat located within an area bordered by said inlet/outlet separator and a protrusion on the inlet port,
  (d) a valve guide cap affixed to the valve guide port, said cap having:
    (1) a vertically oriented valve guide cavity, and
    (2) a horizontal bore having a first port section and a concentric second port section that interfaces with an aperture section that is centered and that intercepts the valve guide cavity, (e) a control valve consisting of a seat disk having an upwardly extending valve stem, where the seat disk is sized to rest on the valve seat and the valve stem is slideably located within the vertical valve guide cavity, where when no flow is present, the upper end of the valve stem is positioned below said aperture section and conversely, when a flow is present, the flow causes the seat disk to rise from its valve seat and the upper end of the valve stem to move across the path of the aperture section, (f) a light transmitting device located within the first port section, and (g) a light receiving device located within said second port section, where when said upper end of said valve steam is positioned below said aperture section, the light transmitted from said light transmitting device is received by said light receiving device causing a no-flow signal to be produced and when said valve stem raises and moves across the path of said aperture section, due to fluid flow, the light beam is broken causing said light receiving device to stop the no-flow signal and instead produce the flow trigger signal.

10. An automatic fluid-flow sensor and fluid shut-off system that functions in combination with a water supply source applied through a main water pipe connected in-line with a main water valve and pressure regulator, said system comprising:

A. an electrical valve connected in line with said main water valve,

B. a flow-sensing valve comprising:
  (a) a housing comprising:
    (1) an inlet and outlet port that are connected in-line with said main water valve,
    (2) a vertically oriented valve guide port,
    (3) a valve guide cap affixed to the valve guide port, said cap having a vertically oriented valve guide cavity having a horizontal bore therethrough that intercepts the valve guide cavity,
  (b) a control valve consisting of a seat disk having an upwardly extending valve stem, where the disk sits on a valve seat located within said housing and the valve stem is slideably located within the valve guide cavity where when no flow is present, the upper end of the valve stem is positioned below the horizontal bore and conversely, when a flow is present, the flow causes the seat disk to rise from its valve seat and the upper end of the valve stem to move across the path of the horizontal bore,
  (c) a light transmitting device located on one side of the horizontal bore and a light receiving device located on the opposite side of the horizontal bore, where when the upper end of the valve stem is positioned below the horizontal bore the light transmitted from said light transmitting device is received by said light receiving device causing a no-flow signal to be produced and when the valve stem raises and moves across the paht of the horizontal bore, due to fluid flow, the light beam is broken causing said light receiving device to stop the no-flow signal and instead produce a flow trigger signal, C. an electronics control unit having the means to:
  (a) control the application of an a-c voltage that turns on said electrical valve,
  (b) receive and process the no-flow or flow trigger signals from said flow sensing valve,
  (c) start a programmable timer circuit when the flow trigger signal is received, that upon the lapsing of a preset time, a signal is produced that energizes a power relay that when energized removes the a-c power being applied to said electrical valve which causes said valve to close and stop the fluid flow, and
  (d) a rest circuit having the means to produce a reset signal that allows said programmable timer to restart after its preset time has lapsed.

* * * * *